Oct. 19, 1971    H. J. WOODWARD    3,613,356
AUXILIARY BRAKING SYSTEM

Filed Aug. 4, 1969

INVENTOR.
HEBER JAY WOODWARD
BY
ATTORNEY

Oct. 19, 1971  H. J. WOODWARD  3,613,356
AUXILIARY BRAKING SYSTEM
Filed Aug. 4, 1969  3 Sheets-Sheet 2
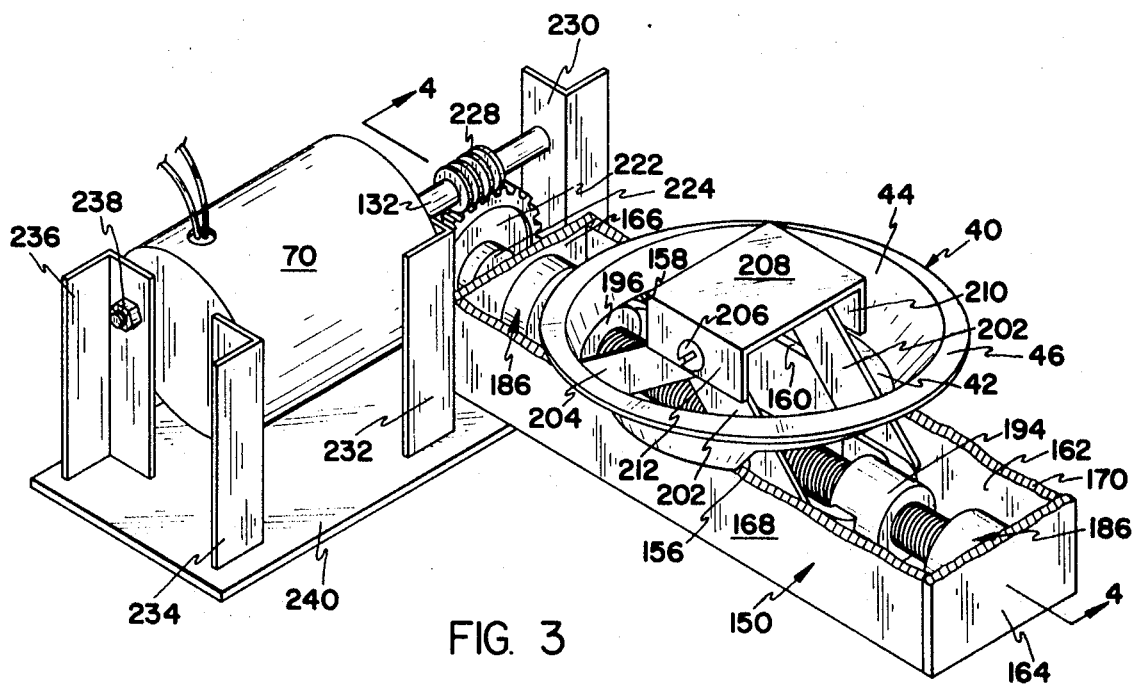
FIG. 3
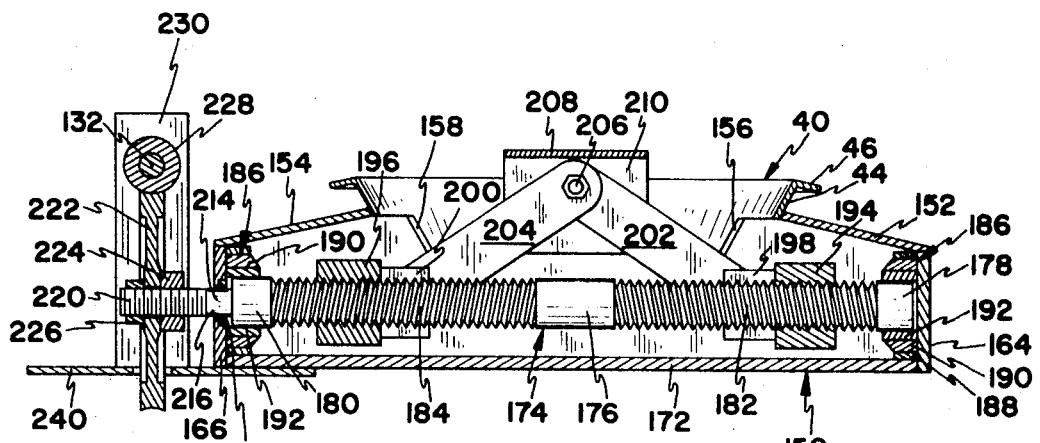
FIG. 4
INVENTOR.
HEBER JAY WOODWARD
BY
ATTORNEY Oct. 19, 1971  H. J. WOODWARD  3,613,356
AUXILIARY BRAKING SYSTEM
Filed Aug. 4, 1969  3 Sheets-Sheet 3
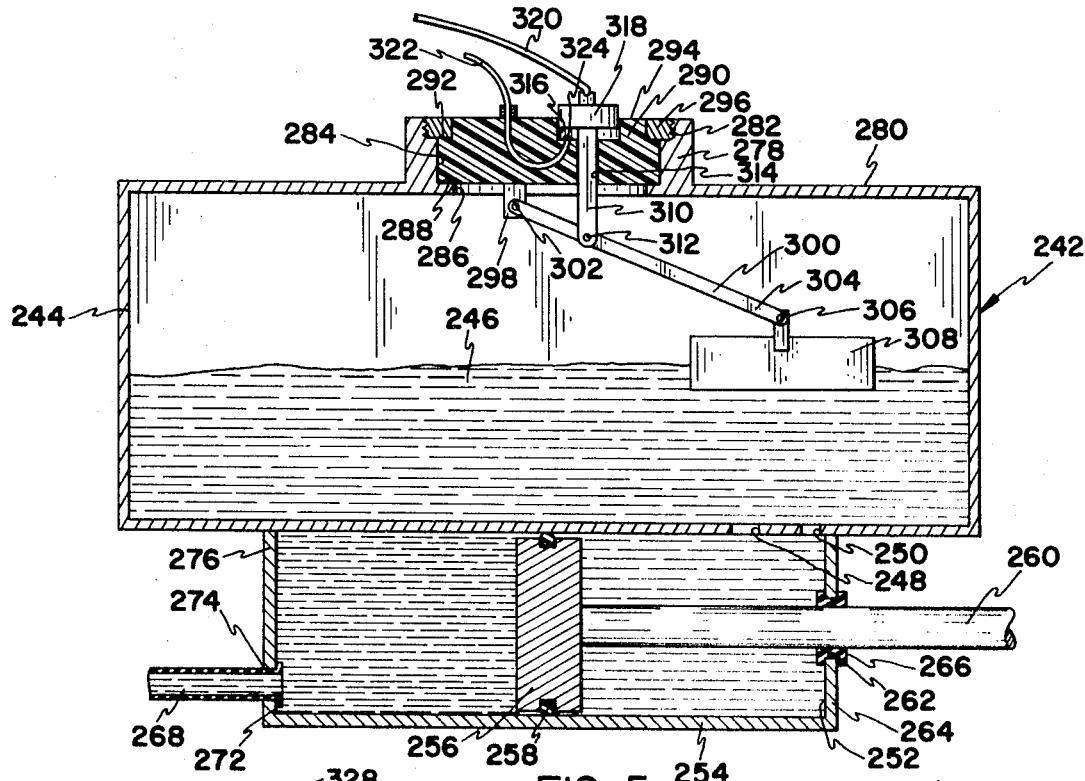
FIG. 5
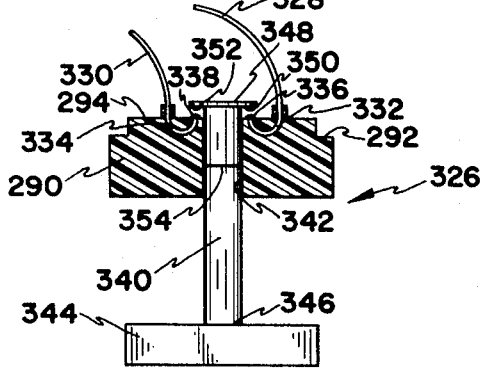
FIG. 6
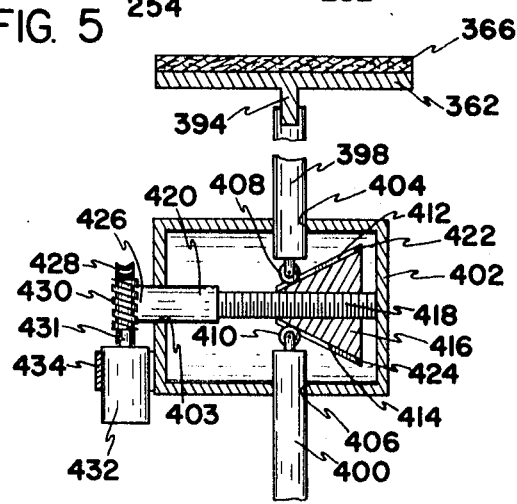
FIG. 8
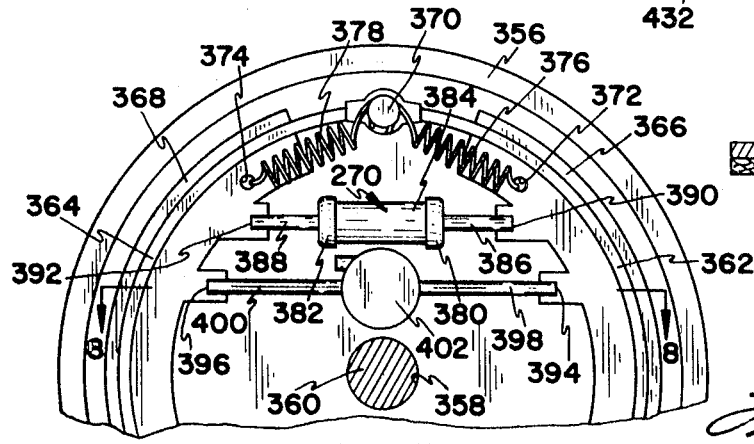
FIG. 7
INVENTOR.
HEBER JAY WOODWARD
BY
ATTORNEY

United States Patent Office 3,613,356
Patented Oct. 19, 1971

3,613,356
AUXILIARY BRAKING SYSTEM
Heber Jay Woodward, Salt Lake City, Utah, assignor to Index Industries, Inc., Salt Lake City, Utah
Filed Aug. 4, 1969, Ser. No. 847,278
Int. Cl. F01b 21/00
U.S. Cl. 60—6          3 Claims

ABSTRACT OF THE DISCLOSURE

Method and apparatus for applying brakes, the apparatus including an electrically driven displaceable plunger situated so as to oppose the actuating rod of an air brake system and, when the plunger is advanced into engagement with the actuating rod, the brakes of a vehicle will be applied independent of the presence of pressurized air. In another embodiment, a hydraulic fluid master cylinder is provided with a float which indicates the amount of fluid in the master cylinder reservoir. An electrically driven rod advances or retracts a wedge nut having opposed ramp surfaces so that the spacing between push arms, attached to the brake shoes of a hydraulic braking system, is varied between a fully applied and a fully released braking condition.

BACKGROUND

Field of the invention

The present invention relates to braking systems and more particularly to methods and apparatus for setting or applying both air brakes and hydraulic brakes in the event of failure of fluid pressure.

The prior art

Commonly, vehicles use air or hydraulic braking systems. Normally the successful operation of the braking systems is dependent upon the existence of fluid subjected to high pressure. Usually the existence of the pressurized fluid can be detected when the vehicle is running and under full control of the operator. However, when the vehicle is stopped or parked, and when the vehicle is unattended by an operator, failure of the brakes due to leakage of fluid or failure of pressurizing structure cannot be readily detected. Thus, the brakes of parked vehicles are frequently inadvertently released and, if the vehicle was parked on an incline or decline, the vehicle may become a "runaway" and incur much damage.

Auxiliary and emergency braking apparatus are well known in the art and generally include cables or other devices which have proved to be either undependable or highly complex and expensive.

BRIEF SUMMARY AND OBJECTS OF THE INVENTION

The present invention comprises novel methods and apparatus, the apparatus being selectively actuated to positively apply vehicle brakes independent of the existence of pressurized fluid. Also, a warning system is provided to warn a vehicle operator when the amount of actuating fluid is low.

It is a primary object of the present invention to provide novel brake applying apparatus and methods.

It is another important object of the present invention to provide a unique braking system, including apparatus and method, for use with air brakes.

One still further significant object of the present invention is to provide improved auxiliary braking structure and method for use with hydraulic brakes.

Another and no less important object of the present invention is to provide novel hydraulic fluid indicating structure.

These and other objects and features of the present invention will become more fully apparent from the following description and appended claims taken in conjunction with the accompanying drawings wherein:

BRIEF DESCRIPTION OF THE DRAWINGS

FIG. 3 is a fragmentary perspective illustration of still another presently preferred embodiment of brake applying structure;

FIG. 4 is a longitudinal cross section taken along lines 4—4 of FIG. 3;

FIG. 5 is a cross sectional elevation of a hydraulic cylinder with a presently preferred fluid indicating embodiment of the invention;

FIG. 6 is a side elevational view of another presently preferred fluid indicating embodiment of the invention shown partially in cross section;

FIG. 7 is a fragmentary side elevational view of hydraulic braking structure and a presently preferred embodiment of the invention used therewith; and FIG. 8 is a horizontal cross section taken along lines 8—8 of FIG. 7.

DETAILED DESCRIPTION OF THE PREFERRED EMBODIMENTS

Application to air braking systems

Figure 1:
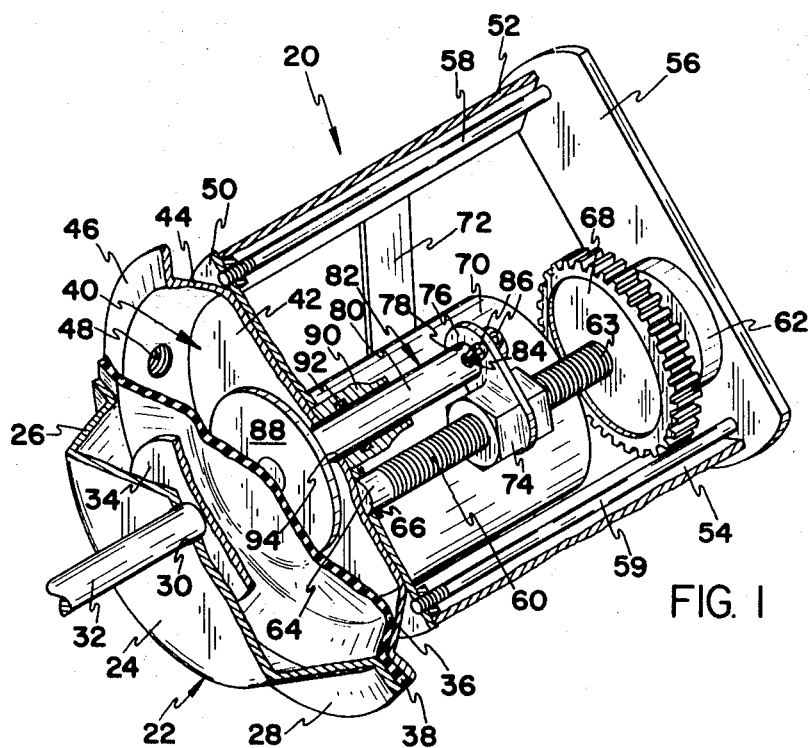
FIG. 1 is a fragmentary perspective view of a presently preferred embodiment of the invention illustrated in conjunction with conventional air brake structure.

Attention is now directed particularly to FIGS. 1–4 wherein like parts are designated with like numerals throughout. Referring particularly to FIG. 1, an auxiliary brake applicator generally designated 20 is illustrated. The brake applicator 20 is particularly useful when coupled to conventional air brake structure generally designated 22. The conventional air brake structure 22 generally comprises an accumulator chamber 24 which is generally annular in configuration and presents an outwardly tapered wall 26 which terminates in a radially projecting flange 28. Flange 28 is preferably bent slightly out of the horizontal toward the accumulator 24 for the reasons hereinafter more fully described. The accumulator chamber 24 is provided with a central aperture 30 through which a push rod 32 is normally reciprocably disposed. Push rod 32 terminates in a radially projecting plate 34 and has, at the initial end (not shown), a coupling to connect the rod 32 to conventional brake shoe actuating structure (not shown).

A diaphragm 36 having a shape which is opposite-hand and generally complementary to the shape of the accumulator chamber 24 is disposed opposite the accumulator chamber 24. The diaphragm 36 has a peripheral lip 38 which is normally superimposed over the flange 28 of the accumulator chamber 24.

A chamber cap 40 has a configuration which is similar to the configuration of the accumulator chamber 24 and is oriented in opposition thereto, the accumulator cap having a flat central portion 42, an outwardly tapered wall portion 44 and a radially outwardly projecting flange 46. The flange 46 is adapted to be disposed in register with the flange 28 of the accumulator chamber 24 so that the lip 38 of the flexible diaphragm 36 is interposed therebetween. It is presently preferred that an annular clamp (not shown) be disposed around the flanges 28 and 46 and tightly clamped thereon so that an air seal is formed between each of the flanges 46 and 28 and the diaphragm lip 38. The slight reverse bend traversed by flanges 28 and 46 improves air tight seal formed by squeezing the flanges upon the diaphragm lip 38.

An aperture 48 is disposed in the side 44 of the cap 40, the aperture 48 communicating with a fitting (not shown) adapted to couple with a high pressure air source. When air under pressure enters through the aperture 48, the diaphragm 36 is displaced from the illustrated position superimposed over the interior of the accumulator cap 40 to a position superimposed over the interior of the accumulator chamber 24. During the mentioned displacement, the diaphragm 36 impinges upon the plate 34 and forces the push rod 32 axially until the plate 34 engages the accumulator chamber 24 as illustrated in FIG. 1. When the push rod 32 is in the displaced condition, the vehicle brakes are fully applied.

According to the present invention, the accumulator cap 40 is rigidly secured, such as by welding or the like, to an annular disc 50. Disc 50 is attached to longitudinal braces 52 and 54 which are, in turn, connected to a cross brace 56. If desired, the longitudinal braces 52 and 54 may be welded to the cross brace 56 and to the annular disc 50. Alternatively, the longitudinal braces 52 and 54 may serve as spacers whereupon the cross brace 56 is rigidly connected to the annular disc 50 with elongated bolts 58 and 59.

A threaded shaft 60 is disposed between the cross brace 56 and the disc 50, the shaft 60 being interposed in a bearing (not shown) disposed in an annular boss 62 carried by the cross brace 56. The leading end 64 of the shaft 60 is disposed in an aperture 66 in the disc 50 and, if desired, may be separated therefrom with a bearing (not shown). An annular pinion gear 68 is disposed adjacent the trailing end 63 of the shaft 60, the pinion gear 68 having a diametral dimension which is substantially greater than the diametral dimension of the shaft 60. Pinion 68 is integral with the shaft 60 and is driven by a drive gear (not shown) disposed on the armature of motor 70. Motor 70 is preferably a reversible electric motor powered from a power source (not shown) such as the battery of a vehicle. Preferably, the control switch for the motor 70 is disposed remote of the motor in the vehicle within easy reach of an operator of the vehicle. The position of the motor 70 is maintained rigid with respect to the longitudinal braces 52 and 54 by transverse brace 72.

As the pinion 68 is driven, the threaded shaft 60 is driven therewith. A sleeve 74 is interiorly threaded and is disposed in mating relation upon the threaded portion of shaft 60. Sleeve 74 is provided with an outwardly projecting tab 76 having a transverse aperture 78 therethrough.

A rod 80 comprising part of a plunger generally designated 82 is, in the assembled condition, disposed through the aperture 78. Rod 82 has spaced apertures 84 which receive cotter pins 86 to prevent the rod 80 from becoming disengaged from the tab 76. Rod 80 is disposed through a guide sleeve 90 which is integral both with the annular disc 50 and with the flat central portion 42 of the cap 40. The guide sleeve 90 is provided with an annular seal 92 which fits tightly around the rod 80 to prevent the pressurized air normally within the accumulator cap 40 from escaping around the rod 80.

Rod 80 also projects into the accumulator cap 40 through an aperture 94 in the flat central portion 42. The plunger 82 comprises a platform 88 which is integrally united with the rod 80 interior of the accumulator cap 40.

In the operation of the embodiment illustrated in FIG. 1, the motor 70 is energized by closing the remote switch (not shown), the motor 70 driving the pinion 68 and integral shaft 60. The sleeve 74, which is prevented from rotating because of the eccentric connection of plunger 82 and tab 76, will be advanced along the threaded portion of the shaft 60 to axially displace the plunger 82 into the interior of the cap 40. The platform 88 will engage the plate 34 and force the rod 32 outwardly to its most extended position thereby causing the vehicle brakes to be applied. Thus, the brakes are applied independent of the existence of pressurized air within the cap 40. When it is desired to release the brakes, the motor 70 is reversed whereupon the sleeve 74 retracts relative to the shaft 60 and the platform 88 returns to the position illustrated in FIG. 1.

Figure 2:
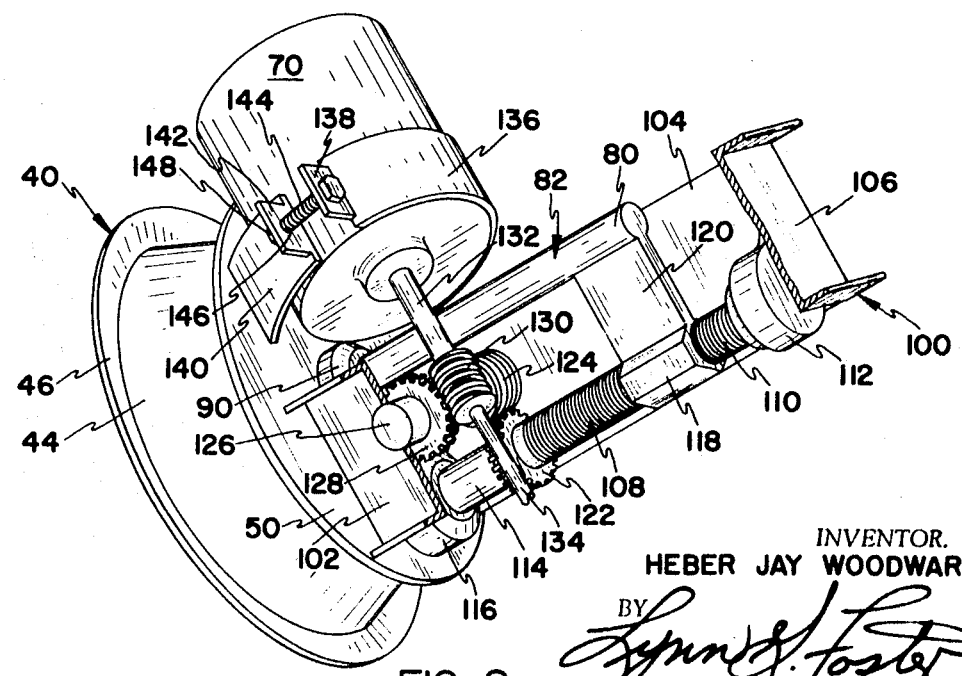
FIG. 2 is a perspective illustration of another presently preferred brake applying embodiment of the invention.

Reference is now made to FIG. 2 wherein another presently preferred embodiment of the invention having particular application to air brakes is illustrated. The embodiment of FIG. 2 is illustrated with the accumulator cap 40 intact and with the accumulator chamber and diaphragm removed. As illustrated in FIG. 2, a generally U-shaped brace 100 has legs 102 and 104 which are fixed to the annular disc 50 such as by welding. The legs 102 and 104 are connected by cross member 106. A threaded shaft 108 is disposed between the cross member 106 and the annular disc 50, the distal end 110 of the shaft 108 is being disposed in a bearing 112 and the proximal end 114 of the shaft 108 being disposed in bearing 116. The bearing 112 is non-rotatably fixed to the cross member 106 such as by welding and the bearing 116 is welded or otherwise non-rotatably fixed to the annular disc 50.

An internally threaded sleeve 118 is threadedly surmounted upon the shaft 108. A radially outwardly projecting arm 120 is integral with the sleeve 118 and is also integrally joined to plunger rod 80 of the plunger 82 in cantilever configuration. The shaft 108 is adapted to rotate in the bearings 112 and 114 and, as the shaft rotates, the sleeve 118 and connected plunger 82 will be axially displaced.

A worm gear 122 is non-rotatably joined to the shaft 108 adjacent the proximal end 114. Worm gear 122 is driven by worm 124 which is integrally joined to shaft 126. Shaft 126 is disposed in a plane essentially normal to the axis of shaft 108 and is rotatably carried in apertures (not shown) in the legs 102 and 104 of the brace 100. If desired, the shaft 126 may be supported upon bearings (not shown).

Shaft 126 is also provided with a worm gear 128 non-rotatably connected to the shaft 126 and normally meshing with a second worm 130. The second worm 130 is non-rotatably joined to a drive shaft 132 comprising part of the armature of the electric motor 70. It should be observed that the free end 134 of the shaft 132 has a reduced diametral dimension to allow the free end 134 to pass next to and beyond the shaft 108 without touching the shaft 108.

The motor 70 is joined to the annular disc 50 with a contoured bracket 136 which is welded or otherwise joined to the disc 50. As illustrated in FIG. 2, the bracket 136 has an outwardly projecting tab 138. An opposing bracket member 140 terminates in a tab 142, tab 142 and tab 138 being spaced one from another. A bolt 144 is disposed through aligned apertures 146 in the tabs 138 and 142 and threadedly engages a nut 148. When the nut 148 is tightened upon the bolt 144, the bracket 136 and the bracket member 140 are drawn together to tightly grip the motor 70 to retain the motor 70 rigidly in the position illustrated in FIG. 2.

The method of operation of the embodiment of FIG. 2 is similar to the method of operation of the embodiment of FIG. 1. As the motor 70 rotates drive shaft 132, the worm gear linkage drives the shaft 108 so that sleeve 118 and integrally connected plunger 182 are displaced along an axis generally normal to the axis of drive shaft 132. Displacement of the plunger assembly 82 will actuate the conventional air brake structure 22 (FIG. 1).

Reference is now made to the embodiment of FIGS. 3 and 4 which illustrate an alternate air brake actuating apparatus, the conventional air brake structure, which may be the same as air brake structure 22 illustrated in FIG. 1, having been removed for ease of illustration. As shown in FIGS. 3 and 4, the accumulator cap 40 is mounted upon an elongated essentially rectangular housing 150, the housing 150 having upwardly sloped top edges 152 and 154 (see FIG. 4) which are welded or otherwise rigidly attached to the side wall 44 of the cap 40. The location of the attachment of the top edges 152 and 154 to the side wall 44 is essentially intermediate the length of the wall 44 and the cap 40 is provided with the notches 156 and 158 which are essentially as wide as the housing 150. A slot 160 in the flat central portion 42 of the cap 40 is longitudinally aligned with the housing 150 and connects the notches 156 and 158 so that there is open communication between the interior 162 of the housing 150 and the interior of the cap 40.

The housing 150 is closed by sealed ends 164 and 166, sides 168 and 170 and bottom 172. Connections between the cap 40 and the housing 150 are sealed so that the cap 40 and housing 150 form an air-tight chamber when conventional air brake structure is attached to the cap 40 (e.g. conventional air brake structure 22 illustrated in FIG. 1).

A shaft 174 having an axis directed along the longitudinal axis of the housing 150 is rotatably disposed within housing 150. Shaft 174 has a smooth central portion 176 and smooth ends 178 and 180, respectively. Shaft 174 is threaded as at 182 between the central portion 176 and the end 178. Similarly, the shaft 174 is threaded as at 184 between the central portion 176 and the end 180, the threaded portion 184 having threads which are opposite hand from the threaded portion 182.

Each of the smooth ends 178 and 180 are disposed in essentially identical bearing assemblies 186. Each bearing assembly 186 comprises a bearing clamp 188 which may be an annular split ring welded or otherwise rigidly secured to the respective ends 164 and 166 of the housing 150. A bearing retainer 190, held in place by the clamp 188, circumscribes an annular bearing 192 in which the smooth ends 178 and 180 of the shaft 174 rotate.

Each of the threaded portions 182 and 184 of the shaft 174 are provided with surmounting annular sleeves 194 and 196 respectively. Each sleeve 194 and 196 is interiorly threaded so as to mate with the respective threaded portions 182 and 184 of shaft 174. Thus, as shaft 174 is rotated within bearing assemblies 186, the sleeves 194 and 196 will advance in a direction toward one another and, when the shaft 174 is rotated in the opposite direction, the sleeves 194 and 196 will retract away from one another.

Sleeves 194 and 196 have integral brackets 198 and 200 which are respectively pivotally attached to arms 202 and 204. Each of the arms 202 and 204 are pivotally connected to pivot bolt 206 disposed in the generally U-shaped platform 208. The pivot bolt 206 is disposed through the downwardly projecting sides 210 and 212 of the platform 208 so that platform 208 can be rotated only slightly around the axis of bolt 206 out of the position illustrated in FIGS. 3 and 4.

Arms 202 and 204 move with scissor action when the sleeves 194 and 196 advance toward one another, the arms 202 and 204 forcing the platform 208 in the outwardly extended position illustrated in the figures. When the sleeves 194 and 196 retract one away from the other, platform 208 is withdrawn into the cap 40 adjacent the flat central portion 42 thereof.

With reference to the way in which shaft 174 is rotated, attention is directed particularly to FIG. 4. The smooth end 180 of shaft 174 is integral with a reduced diametral portion 214 which is situated in aperture 216 in the end 166 of the housing 150. Aperture 216 is provided with an air seal 218 which prevents escape of air between the shaft portion 214 and the end 166. Shaft portion 214 terminates in a threaded tip 220.

A worm gear 222 having an annular boss 224 is secured to the threaded tip 220 and made non-rotatable relative to the shaft 174 such as by nut 226. Clearly, if desired, the worm gear 224 may be non-rotatably secured to the threaded tip 220 in any suitable manner. As best shown in FIG. 3, the worm gear 222 is driven by a worm 228 non-rotatably joined to the drive shaft 132 of the reversible electric motor 70.

With continued reference to FIG. 3, the drive shaft 132 is mounted for rotation in an angular support bracket 230 and the motor 70 is rigidly supported by support brackets 232, 234 and 236 such as with bolts 238. The support brackets 230, 232, 234 and 236 are welded or otherwise rigidly joined to a support platform 240. It can be appreciated that when motor 70 rotates in one direction, the shaft 174 will rotate so that platform 208 projects outwardly from the cap 40 to engage conventional brake structure 22 (FIG. 1). Also, when the motor 70 is operated in the reverse direction, the platform 208 will be retracted away from the conventional brake applying structure.

Application to hydraulic braking systems

Referring now to FIG. 5, a hydraulic master cylinder generally designated 242 comprises an enclosed reservoir 244 having a volume of hydraulic fluid 246 disposed therein. The reservoir 244 has apertures 248 and 250 disposed in the bottom thereof. The apertures 248 and 250 communicate with the interior 252 of an accumulator chamber 254. A piston 256 is disposed within the accumulator chamber 254 and is provided with an O-ring or seal 258 which forms a fluid seal between the piston 256 and the interior surface 252 of the accumulator chamber 254. Piston 256 is displaced longitudinally within the accumulator chamber 254 by a piston rod 260 which is connected to, for example, the brake pedal of a vehicle. Piston rod 260 is disposed through an aperture 262 in the end 264 of the accumulator 254. A rubber seal 266 is disposed in the aperture 262 between the piston rod 260 and the end 264 to provide a fluid seal therebetween. If desired, the seal 266 may be fabricated from any other suitable sealing material.

When the piston 256 is displaced toward the right of FIG. 5 by a force exerted on piston rod 260, hydraulic fluid 246 disposed on the right of piston 256 in the accumulator 254 will be forced through apertures 348 and 250 into the reservoir 244. When the piston 256 is displaced as far as possible to the right of FIG. 5, hydraulic fluid in the reservoir 244 will be allowed to flow through the aperture 248 into the accumulator chamber 254 on the left-hand side of 256. Thereafter, when the piston 256 is displaced toward the left of FIG. 5, such as when the brakes are applied, hydraulic fluid to the left of piston 256 will become compressed within the accumulator chamber 254 and the pressurized fluid will be allowed to escape through the hydraulic line 268 to the hydraulic brake applying mechanism generally designated 270 (FIG. 7), hereinafter more fully described. The hydraulic line 268 has an enlarged end 272 which is disposed through an aperture 274 in the end 276 of the accumulator 254. The enlarged end 272 prevents inadvertent expelling of the hydraulic line 268 from the accumulator chamber 254.

The reservoir 254 is provided with an annular boss 278 which projects upwardly on the top surface 280 of the master cylinder 242. The boss 278 has a stepped bore including an exterior step 282 which is threaded, an intermediate step 284 having a diametral dimension which is less than the diametral dimension of the exterior step 282, and an interior step 286. The interior step 286 has a diametral dimension smaller than the diametral dimension of the intermediate step so as to form a shoulder 288 and open to the interior of the reservoir 244.

An annular plug 290 preferably formed of synthetic insulator material has a diametral dimension which allows the plug 290 to fit snugly against the intermediate step 286 of the annular bore in boss 278. The plug 290 abuts and rests upon shoulder 288. It is presently preferred that plug 290 be provided with a peripheral annular shoulder 292 which is recessed from the upper surface 294 of the plug 290 by an amount equal to the depth of the exterior step 282. An annular ring 296 has exterior threads on the periphery thereof which mate with the threaded step 282 of the bore in boss 278. Thus, the ring 296 is a locking ring which, when tightly threaded within the boss 278, urges the plug 290 into fluid-tight relation with the shoulder 288.

A downwardly projecting tab 298 is integrally united with the plug 290 and is pivotally attached to a lever 300 by pivot pin 302. The remote end 304 is pivotally attached by pin 306 to a float 308 of any suitable conventional type. Float 308 preferably has a smaller diametral dimension than the diametral dimension of interior step 286 so that the float 308 may be easily inserted through the bore in boss 278 to the interior of reservoir 244. The pivotal connections at 302 and 306 allow the float 308 to continuously ride upon the surface of the hydraulic fluid 246.

An essentially vertically disposed arm 310 is pivotally connected by pin 312 to the lever 300 at a location immediately beneath the plug 290. The arm 310 is disposed in a transverse bore 314 in the plug 290 so that the arm 310 is reciprocable in the bore 214. Bore 314 has an annularly enlarged portion 316 which opens to the exterior at the surface 294. An annular disc 318 is integrally mounted upon the arm 310 and is reciprocably movable within the enlarged portion 316 of the bore 314. The disc 318 is preferably formed of electrically conductive material. An electrical wire or cord 320 is electrically coupled to the disc 318 so that the disc 318 is electrically energized from a power source (not shown). Another electrical cord 322 is mounted within the plug 290 and is exposed within the enlarged portion 316 of the bore 314 so as to form an electrical contact 324. Cord 322 is preferably connected into electrical circuitry (not shown) which provides a power source and a warning system.

Thus when the level of hydraulic fluid 246 becomes low in the reservoir 244, the float 308 will cause the lever 300 to displace the arm 310 downwardly until the contact 324 is met by the conducting disc 318. When disc 318 touches contact 324, an electrical circuit will be completed to give a warning at a remote location that the level of hydraulic fluid 246 is low.

If desired, the float structure generally designated 326 and illustrated in FIG. 6 may be substituted for the float 308, lever 300 and arm 310 described in FIG. 5 above. With reference to FIG. 6, the plug 290 has electrical wires 328 and 330 rigidly mounted therein through passageways 332 and 334 respectively. The wires 328 and 330 traverse a reverse curve and are exposed at the surface 294 to form contacts 336 and 338.

A plunger shaft 340 is disposed within a bore 342 located essentially central of the plug 290. The plunger shaft 340 is reciprocably movable within the bore 342, plunger shaft 340 having a float 344 integrally united to the lower end 346 of the plunger shaft. The upper end 348 is diametrally enlarged to form an annular disc. The disc 348 has downwardly directed contacts 350 and 352 oriented so as to be vertically aligned with contacts 336 and 338. When the level of hydraulic fluid 246 becomes low in the reservoir 244 (FIG. 5) the float 344, normally carried upon the upper surface of the hydraulic fluid 246, will be allowed to move downwardly until contact points 336 and 338 are met by contacts 350 and 352, respectively. When the contacts meet, an electrical circuit (not shown) is energized which communicates a warning at a remote location that the hydraulic fluid level is low.

It is also presently preferred that the shaft 340 be color coded, one color existing above the line 354 and another color existing below the line 354. Thus, from the exterior of the master cylinder 242, it can be visually observed when the hydraulic fluid level in the reservoir 244 is sufficiently low that the color beneath the line 254 on the shaft 240 disappears from view into the bore 342 of the plug 290. If desired, a window of transparent material (not shown) may be disposed in the wall of the reservoir. The window is fluid sealed to the reservoir and accommodates visual observation of the level of hydraulic fluid.

Reference is now made to FIGS. 7 and 8 which illustrate another embodiment of the invention having application to hydraulic brakes. Referring particularly to FIG. 7, a conventional hydraulic brake system is shown along with the novel improvement comprising the present invention. Conventionally, a backing plate 356 is rigidly mounted upon an axle housing (not shown) and is provided with an aperture 358 through which an axle 360 is disposed. A pair of opposed brake shoes 362 and 364, having brake linings 366 and 368, respectively, are pivotally coupled to an outwardly projecting pin 370 which is rigidly mounted upon the backing plate 356. Each of the brake shoes 362 and 364 has an aperture 372 or 374 into which brake springs 376 and 387 are attached. Brake springs 376 and 378 are also looped over the pin 370 so that the brake shoes 362 and 364 are continuously biased inwardly.

Hydraulic brake applying mechanism 270 is mounted upon the backing plate 356 between the shoes 362 and 364. Conventionally, the hydraulic braking mechanism 270 comprises pistons (not shown) which are outwardly displaced in response to the communication of hydraulic fluid under pressure from hydraulic fluid line 268 (FIG. 5). The mechanism 270 has rubber caps 380 and 382 disposed on either end of piston containing cylinder 384. Rods 386 and 388 are displaced by the outwardly moving pistons against coupling fingers 390 and 392.

Conventionally, when the piston 256 (FIG. 5) forces hydraulic fluid through the fluid line 268, the rods 386 and 388 displace the brake shoes 362 and 364 outwardly into contact with a brake drum (not shown) whereby friction is exerted to stop a moving vehicle.

According to the presently preferred embodiment of the invention, brake shoes 362 and 364 are preferably fashioned with additional coupling fingers 394 and 396. Coupling fingers 394 and 396 are pivotally attached to axially displaceable rods 398 and 400. Rods 398 and 400 are communicated to the interior of a cylindrical housing 402 (FIG. 8) through apertures 404 and 406, respectively. Housing 402 is preferably rigidly mounted upon the backing plate 356. Apertures 404 and 406 are disposed in the curved surface of cylinder 402 and are directed essentially normal to the axis of the cylinder 402.

As best shown in FIG. 8, rods 398 and 400 are provided with rotatable bearing wheels 408 and 410 which are rotatably carried upon the ends of rods 398 and 400, respectively.

Bearing wheels 408 and 410 are normally disposed upon ramp surfaces 412 and 414, respectively, of a conically configurated nut 416. Nut 416 is threadedly surmounted upon the threaded portion 418 of a shaft 420. Although nut 416 is axially displaceable along the threaded portion 418, rotation of the nut 416 relative to the conical housing 402 is prevented. Although rotation of the nut 416 may be prevented in any suitable way, it is presently preferred that the ramp surfaces 412 and 414 be disposed in recesses having upstanding sides 422 and 424. The sides 422 and 424 abut the sides of bearing wheels 408 and 410 to prevent the conical nut 416 from rotating relative to the housing 402.

The shaft 420 is preferably journaled into the housing 402 as at 403 so as to be easily rotatable therein. If desired, bearings (not shown) may be interposed between the shaft 420 and the housing 402 to minimize the friction which may be developed therebetween.

The terminal end 426 of shaft 420 is exposed exterior of the housing 402 through aperture 403 and is integrally united to a worm gear 428. Worm gear 428 meshes with a worm 430 which is non-rotatably secured to the armature or output shaft 431 of an electric motor 432. The electric motor 432 is preferably reversible and, if desired, may be essentially identical to the motor 70 described in connection with FIGS. 1-4 above. If desired, the motor 432 may be mounted upon a bracket 434 disposed between the housing 402 and the backing plate 356. Alternatively, the motor 432 may be disposed on the reverse side (not shown) of the backing plate 356 so that shaft 420 projects through both the housing 402 and the backing plate 356.

As can be appreciated particularly from reference to FIG. 8, as the motor 432 is energized, shaft 420 will rotate so that nut 416 will advance toward the left as viewed in FIG. 8. Bearing wheels 408 and 410 will progress up the ramp surfaces 412 and 414 so that rods 398 and 400 are respectively forced apart. Outward displacement of the rods 398 and 400 results in engagement of the linings 366 and 368 of the brake shoes 362 and 364, respectively, with the brake drum (not shown) causing a moving vehicle to stop. When the direction of the motor 432 is reversed, the mentioned steps are serially reversed so that the bearing wheels 408 and 410 progress down the ramp surfaces 412 and 414, respectively, to allow the brake linings 366 and 368 to move out of contact with the brake drum.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore to be embraced therein.

What is claimed and desired to be secured by United States Letters Patent is:

1. In a fluid activated brake system including an accumulator chamber and a chamber cap of generally complementary configuration, a flexible diaphragm providing a fluid-tight separation between said accumulator chamber and said chamber cap, fluid port means communicating a source of pressurized fluid with the interior of said chamber cap, a plunger member having a brake-actuating shank portion projecting through an aperture in said accumulator chamber and a plated portion disposed within said accumulator chamber and serving to drive said shank portion in response to pressure from fluid in said chamber cap; the improvement consisting of mechanical auxiliary brake actuating means comprising:
   a supporting framework secured to and extending rearwardly from the rear surface of said chamber cap;
   a threaded shaft rotatably journaled in said framework;
   a sleeve member formed with an internally threaded bore carried by said shaft with the threads of said internal bore in mating engagement with the threads of said shaft;
   a brake actuating member fixedly secured to said sleeve member and drivable by said sleeve member into the interior of said chamber cap and into brake-actuating engagement with said plunger;
   a reversible electric motor; and
   gearing means coupling said motor to rotate said threaded shaft.

2. In a fluid actuated brake system including an accumulator chamber and a chamber cap of generally complementary configuration, a flexible diaphragm providing a fluid-tight separation between said accumulator chamber and said chamber cap, fluid port means communicating a source of pressurized fluid with the interior of said chamber cap, a plunger member having a brake-actuating shank portion projecting through an aperture in said accumulator chamber and a plate portion disposed within said accumulator chamber and serving to drive said shank portion in response to pressure from fluid in said chamber cap; the improvement consisting of mechanical auxiliary brake-actuating means comprising:
   a supporting framework secured to and extending rearwardly from the rear surface of said chamber cap and including a cross bar member;
   a threaded shaft rotatably journaled between said cross bar member and the rear surface of said chamber cap;
   a sleeve member formed with an internally threaded bore carried by said shaft with the threads of said internal bore in mating engagement with the threads of said shaft;
   a rod extending generally parallel to said threaded shaft having one end of said rod spaced from and fixedly secured to said sleeve member and having the other end of said rod slideably extending through a fluid-tight seal in the rear surface of said chamber cap and projecting into the interior of said chamber cap;
   a reversible electric motor; and
   gearing means coupling said motor to rotate said threaded shaft member to cause said sleeve member to drive said rod into and out of brake-actuating engagement with said plunger.

3. In a fluid actuated brake system including an accumulator chamber and a chamber cap of generally complementary configuration, a flexible diaphragm providing a fluid-tight separation between said accumulator chamber and said chamber cap, fluid port means communicating a source of pressurized fluid with the interior of said chamber cap, a plunger member having a brake-actuating shank portion projecting through an aperture in said accumulator chamber and a plate portion disposed within said accumulator chamber and serving to drive said shank portion in response to pressure from fluid in said chamber cap; the improvement consisting of mechanical auxiliary brake-actuating means comprising:
   a supporting framework extending rearwardly from the rear surface of said chamber cap;
   a threaded shaft rotatably journaled in said framework and extending transversely of said chamber cap having oppositely thrown threaded portions disposed adjacent respective ends of said shaft;
   a pair of sleeve members each formed with internally threaded bores carried by said shaft and each of said sleeve members having the internal threads thereof in mating engagement with the threads of a respective one of said respective ends of said shaft;
   a brake actuating member;
   scissor-type link means coupling said sleeve members to drive said brake actuating member into the interior of said chamber cap and into brake actuating engagement with said plunger;
   a reversible electric motor; and
   gearing means coupling said motor to rotate said shaft.

References Cited

UNITED STATES PATENTS

| | | | |
|---|---|---|---|
| 1,524,426 | 1/1925 | Farmer | 188—162 X |
| 1,968,584 | 7/1934 | Apple | 188—162 |
| 2,660,026 | 11/1953 | Geyer | 60—6 |
| 2,920,871 | 1/1960 | Kolodin | 74—89.15 X |
| 3,481,252 | 12/1969 | Williams | 188—106 P |

GEORGE A. HALVOSA, Primary Examiner

U.S. Cl. X.R.

188—106 P, 162